United States Patent
Trang et al.

(10) Patent No.: US 9,691,250 B2
(45) Date of Patent: Jun. 27, 2017

(54) SYSTEM, APPARATUS, AND METHOD OF PROVIDING AN ALERT FOR AN INFANT IN A CAR SEAT

(71) Applicants: Victor Trang, Cypress, TX (US); Quen Le Trang, Cypress, TX (US); Lucy Trang, San Jose, CA (US)

(72) Inventors: Victor Trang, Cypress, TX (US); Quen Le Trang, Cypress, TX (US); Lucy Trang, San Jose, CA (US)

( * ) Notice: Subject to any disclaimer, the term of this patent is extended or adjusted under 35 U.S.C. 154(b) by 0 days.

(21) Appl. No.: 15/189,119

(22) Filed: Jun. 22, 2016

(65) Prior Publication Data
US 2016/0379459 A1    Dec. 29, 2016

Related U.S. Application Data

(60) Provisional application No. 62/185,829, filed on Jun. 29, 2015.

(51) Int. Cl.
| | |
|---|---|
| B60Q 1/00 | (2006.01) |
| G08B 21/02 | (2006.01) |
| G08B 21/24 | (2006.01) |
| H04W 4/02 | (2009.01) |
| G08B 25/08 | (2006.01) |

(52) U.S. Cl.
CPC ....... *G08B 21/023* (2013.01); *G08B 21/0225* (2013.01); *G08B 21/0283* (2013.01); *G08B 21/24* (2013.01); *G08B 25/08* (2013.01); *H04W 4/023* (2013.01); *G08B 21/0216* (2013.01)

(58) Field of Classification Search
CPC ............ G08B 21/0216; G08B 21/0225; G08B 21/023; G08B 21/0283; G08B 21/24; H04W 4/023
USPC .......................... 340/457, 457.1, 438; 701/1
See application file for complete search history.

(56) References Cited

U.S. PATENT DOCUMENTS

| | | |
|---|---|---|
| 6,922,147 B1 | 7/2005 | Viksnins et al. |
| 6,998,988 B1 | 2/2006 | Kalce |
| 7,106,207 B1 | 9/2006 | Marchan |
| 8,217,796 B2 | 7/2012 | Trummer |
| 8,768,292 B2 | 7/2014 | Welch |
| 8,816,845 B2 | 8/2014 | Hoover et al. |
| 9,536,408 B2* | 1/2017 | Pinder .................... G08B 21/02 |
| 2003/0122662 A1 | 7/2003 | Quinonez |
| 2009/0277190 A1 | 11/2009 | Piette |
| 2013/0033373 A1 | 2/2013 | Thomas |
| 2013/0201013 A1* | 8/2013 | Schoenberg ............ B60R 22/48 340/438 |
| 2014/0015664 A1 | 1/2014 | Watson |

(Continued)

*Primary Examiner* — Ojiako Nwugo
(74) *Attorney, Agent, or Firm* — Maier & Maier, PLLC

(57) ABSTRACT

A system, apparatus, and method of providing an alert when an infant or child is in a child safety seat in a vehicle. Exemplary embodiments can include a pressure sensor and a transmitted signal, such as a continuously transmitted signal, when an infant or child is in a child safety seat and other conditions are met. In some examples, if a continuously transmitted signal is broken or otherwise fails to transmit, an alert may be provided. The alert may be provided through any of a variety of data transmission protocols to any of a variety of devices or locations, for example a mobile phone, smart phone, dedicated alert device, or emergency call center, depending on desired conditions.

20 Claims, 9 Drawing Sheets

(56) References Cited

U.S. PATENT DOCUMENTS

| | | | |
|---|---|---|---|
| 2014/0085070 A1* | 3/2014 | Schoenberg | B60R 22/48 340/457.1 |
| 2014/0253313 A1 | 9/2014 | Schoenberg | |
| 2014/0253314 A1* | 9/2014 | Rambadt | B60N 2/002 340/457.1 |
| 2014/0361889 A1 | 12/2014 | Wall, II et al. | |
| 2015/0130605 A1* | 5/2015 | Helm | B60N 2/002 340/457.1 |
| 2015/0161868 A1 | 6/2015 | Richards et al. | |
| 2015/0266395 A1* | 9/2015 | Bradley | B60N 2/002 701/1 |

* cited by examiner

SYSTEM, APPARATUS, AND METHOD OF PROVIDING AN ALERT FOR AN INFANT IN A CAR SEAT

CROSS-REFERENCE TO RELATED APPLICATIONS

This application claims priority from U.S. Provisional Patent Application No. 62/185,829, filed on Jun. 29, 2015, entitled "System, Apparatus, and Method of Providing an Alert for an Infant in a Car Seat," the entire contents of which are hereby incorporated by reference.

BACKGROUND

Infants and small children typically utilize various forms of infant and child safety seats, booster seats, and other protective restraints when riding in passenger vehicles. In many cases, the use of such seats is mandated by law and typically is desirable in order to provide proper support, comfort, and protection for infants and small children. Such devices tend to securely hold an infant or child in the seat and often require an adult to experienced user to securely place the infant or child in the seat.

However, due to the nature of infants, children, and safety seats, it is a known problem that infants and children are left in vehicles when parked due to distractions, absent-mindedness, or other such factors, such as the child sleeping or otherwise not making noise in a front- or rear-facing seat. Such situations can be hazardous to the health of the infant or child, particularly in hot or cold weather conditions. Current systems designed to prevent such situations lack the durability, battery life, and functionality to be effective in providing alerts to parents or caregivers.

SUMMARY

A system, apparatus, and method of providing an alert when an infant or child is in a child safety seat in a vehicle. Exemplary embodiments can include a pressure sensor and a transmitted signal, such as a continuously transmitted signal, when an infant or child is in a child safety seat and other conditions are met. In some examples, if a continuously transmitted signal is broken or otherwise fails to transmit, an alert may be provided. The alert may be provided through any of a variety of data transmission protocols to any of a variety of devices or locations, for example a mobile phone, smart phone, dedicated alert device, or emergency call center, depending on desired conditions.

According to an exemplary embodiment, a child safety seat apparatus may be provided. Such a child safety seat may include: a frame; a power supply; a temperature detector; a cushion, including a liquid-tight outer layer, padding, and a pressure-sensitive pad, the pressure-sensitive pad including a pressure sensor, the pressure sensor being configured to detect pressure on at least part of the area of the pressure-sensitive pad, a microcontroller, the microcontroller having a processor and a memory, and a wireless transceiver configured to utilize at least one wireless transmission protocol; a GPS module communicatively coupled to the microcontroller of the pressure-sensitive pad, and configured to provide GPS information to the microcontroller; and a warning system, the warning system including a visual component and an audial component, the visual component including at least one of a light and a visual display, the audial component including at least one of a buzzer, a motor configured to make a detectable noise, or a speaker; wherein the microcontroller is configured to: detect, with the pressure sensor, the placement of the child in the child safety seat; send, with the wireless transceiver, at least one first signal to a mobile communication device; determine whether the mobile communication device is within a specified range of the child safety seat; determine, if the mobile communication device is not within a specified range of the child safety seat, whether there is at least a specified amount of pressure on the pressure sensor; deactivate the alert system if there is not at least a specified amount of pressure on the pressure sensor; send, with the wireless transceiver, at least one alert signal to the mobile communication device if there is at least a specified amount of pressure on the pressure sensor; determine if a response to the alert signal has been received within a specified amount of time, the response to the alert signal including at least one of a reset instruction being delivered to the alert system or the mobile communication device being placed within the specified range of the child safety seat; and send, with the wireless transceiver, at least one alert signal to a communication device of a third party if no response to the alert signal has been received within the specified amount of time, wherein the alert signal comprises GPS location information.

According to another exemplary embodiment, a system for providing an alert when a child is in a child safety seat within a vehicle may be provided. The system may include: a child safety seat, the child safety seat including a cushion having a pressure-sensitive pad, the pressure-sensitive pad including a pressure sensor, the pressure sensor being configured to detect pressure on at least part of the area of the pressure-sensitive pad, a microcontroller, the microcontroller having a processor and a memory, and a wireless transceiver configured to utilize at least one wireless transmission protocol; and a mobile communication device configured to communicate with the wireless transceiver via the at least one wireless transmission protocol; wherein the child safety seat is configured to perform the following actions: detecting, with the pressure sensor, the placement of the child in the child safety seat; sending, with the wireless transceiver, at least one first signal to the mobile communication device; determining, with the microcontroller, whether the mobile communication device is within a specified range of the child safety seat; determining, with the microcontroller, if the mobile communication device is not within a specified range of the child safety seat, whether there is at least a specified amount of pressure on the pressure sensor; with the microcontroller, deactivating the alert system if there is not at least a specified amount of pressure on the pressure sensor; sending, with the wireless transceiver, at least one alert signal to the mobile communication device if there is at least a specified amount of pressure on the pressure sensor; determining, with the microcontroller, if a response to the alert signal has been received within a specified amount of time, the response to the alert signal including at least one of a reset instruction being delivered to the alert system or the mobile communication device being placed within the specified range of the child safety seat; and sending, with the wireless transceiver, at least one alert signal to a communication device of a third party if no response to the alert signal has been received within the specified amount of time.

According to another exemplary embodiment, a method of providing an alert when a child is in a child safety seat within a vehicle may be provided. Such a method may include: placing the child in the child safety seat, the child safety seat being communicatively coupled to an alert system including at least a pressure sensor, a processor, a memory, and a wireless transceiver; activating the alert system; sending, with the wireless transceiver, at least one first signal from the child safety seat to a mobile communication device; determining, with the processor, whether the mobile communication device is within a specified range of the child safety seat; determining, with the processor, if the mobile communication device is not within a specified range of the child safety seat, whether there is at least a specified amount of pressure on the pressure sensor; with the processor, deactivating the alert system if there is not at least a specified amount of pressure on the pressure sensor; sending, with the wireless transceiver, at least one alert signal to the mobile communication device if there is at least a specified amount of pressure on the pressure sensor; determining, with the processor, if a response to the alert signal has been received within a specified amount of time, the response to the alert signal including at least one of a reset instruction being delivered to the alert system or the mobile communication device being placed within the specified range of the child safety seat; and sending, with the wireless transceiver, at least one alert signal to a communication device of a third party if no response to the alert signal has been received within the specified amount of time.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Figure 1:
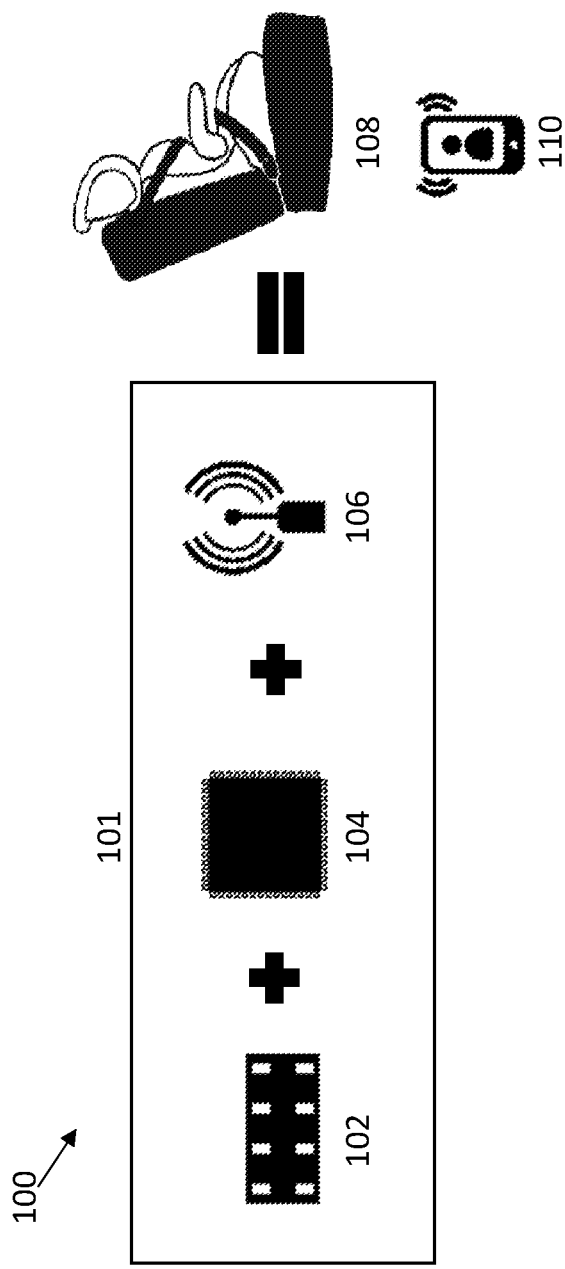
FIG. 1 is a diagram showing an exemplary embodiment of an alert system.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein may be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

An exemplary embodiment of a system, apparatus, and method of providing an alert related to the presence of an infant or child in a child safety seat, car seat, booster seat or the like may be shown and described. It may be appreciated that for purposes of the exemplary embodiments described herein, child and infant, or any other type of person or even pet, may be used interchangeably and should not be interpreted as limiting. Further, any discussion regarding a child safety seat, infant seat, booster seat, and the like may be used interchangeably and should not be interpreted as limiting. Further, it may be appreciated that exemplary embodiments described herein may be used in any environment and on any type of seat or seating surface, as desired.

Generally referring to exemplary FIGS. 1-4, the alert system may utilize any of a variety of components. The alert system may be such that a pressure sensitive pad may be coupled with a data transmission device and microcontroller, allowing for the continuous transmission of data to a mobile communication device upon the sensing of certain conditions by the pressure sensitive pad. Additionally, when a further condition is met, such as a break in the transmission of data, an alert may be provided to the mobile communication device or third party. Alternatively, if the pressure sensitive pad is set to an alternative condition, the alert system may be deactivated or may enter into a passive mode.

Referring now to exemplary FIG. 1, an embodiment of an alert system may be shown. The alert system 100 may include any of a variety of components 101, for example, formed into a device. The components 101 may be formed so that they are coupled together in a desired fashion, for example being housed in a liquid-tight pad that may be coupled to or attached to a child safety seat. The components 101 may be formed in a thin fashion so as to be placed beneath or within padding in the child safety seat or on top of padding of the child safety seat, as desired, and may be such that the comfort and safety features and functionality of the child safety seat are not affected or impacted. Additionally, the components 101 may be secured to the child safety seat in any desired fashion, including straps, hook and loop fasteners, releasable or permanent adhesive, other mechanical securing or coupling manners, or any combination thereof.

Still referring to exemplary FIG. 1, the components may include a pressure sensor 102. Pressure sensor 102 may be any form of pressure sensor, as desired. In some exemplary embodiments, an NXP SEMICONDUCTORS MPL3115A2 pressure sensor may be utilized, although it may be appreciated that any other type of pressure sensor may be used interchangeably, as desired. Additionally, the pressure sensor 102 may function in known fashions, for example, to detect pressure or weight in an area. For example, according to an exemplary embodiment, the pressure sensor 102 may be configured to function over all or part of the area of a child safety seat to which components 101 of alert system 100 may be coupled.

Additionally, as shown in exemplary FIG. 1, a computer incorporating a processor and a memory, such as a microcontroller 104, may be utilized. Microcontroller 104 may be any desired type of microcontroller, for example a FREESCALE SEMICONDUCTOR-NXP model MKL02Z16VFG4 microcontroller, although it may be appreciated that other types of microcontrollers or other computer systems may be used interchangeably, as desired. Microcontroller 104 may provide processing capabilities, may include memory or storage function capabilities and may function in any known or desired fashion of microcontrollers. Additionally, components 101 can include data transmission module 106. As shown in exemplary FIG. 1, data transmission module 106 may provide Bluetooth data transmission capabilities. However, with this and other exemplary embodiments, it may be appreciated that any of a variety of data transmission capabilities may be utilized herein, as described below. Further, data transmission module 106 can include digital enhanced cordless telecommunications (DECT) capabilities, allowing for phone calls and text messages to be sent therefrom.

Still referring to exemplary FIG. 1 and components 101 of alert system 100, components 101 may be powered by any desired power source. For example, components 101 may be powered by a connection to a vehicle's electrical system or a battery. In exemplary embodiments where components 101 are powered by a battery, the battery may be such that it may have a long functional life, for example two or more years, so it may be utilized with a child as the child advances from an infant carrier to a child safety seat to a booster seat, and the like. A battery or batteries may also be rechargeable, as desired, and an alert, communication, or notification can be provided in the event of a low power or low battery situation. Further, it may be appreciated that components 101 may include any other desired electronic sensing, processing, controlling, and/or storage capabilities. For example, components 101 may include a temperature sensor, an accelerometer, global positioning system, a display, an audio system, or the like.

In exemplary FIG. 1, alert system 100 may be designed to be used in a child safety seat in car 108. As described above, components 101 may be formed such as to be coupled to a child safety seat in any desired fashion. A child, infant, or the like may then be placed in the child safety seat and alert system 100 may be activated. Activation of alert system 100 may be accomplished through any of a variety of manners, including a switch associated with components 101, where the switch power may be manually activated, may be automatically activated upon pressure sensor 102 sensing pressure, or may be activated by an outside source, such as mobile communication device 110.

Mobile communication device 110 may be any type of device, such as, but not limited to, a mobile phone, smart phone, computer, tablet computer, key fob, or the like. Alert system 100 may communicate with mobile communication device 110 in any desired fashion, for example using wired or wireless data transmission. For example, the mobile communication device 110 may have a Bluetooth pairing with the components 101 of the alert system 100 in any known or desired fashion and a visual or audio indication on components 101 can indicate a successful pairing. In some further exemplary embodiments, mobile communication device 110 may include software that allows for the activation, deactivation, operation, programming, setting of features, customization, and other utility functions with respect to alert system 100. It can further be appreciated, in some exemplary embodiments, that alert system 100 may have any type of software associated with it. Such software may be accessible directly on a display component (not pictured) of alert system 100, on a software application on a mobile communication device 110, through the display component of another connected device (such as a display component of the vehicle that the alert system 100 is housed in), or through any other desired manner. Additionally, it may be appreciated that such communication may often take place in a wireless fashion. In such exemplary embodiments, any known or desired form of wireless communication may be utilized, for example near field communication, Bluetooth, 3G, 4G, LTE, 5G, or the like, or any combination thereof. Additionally, as discussed below, different forms of wireless communication may be utilized or desired at different times, depending on any of a variety of circumstances associated with alert system 100.

Figure 2:
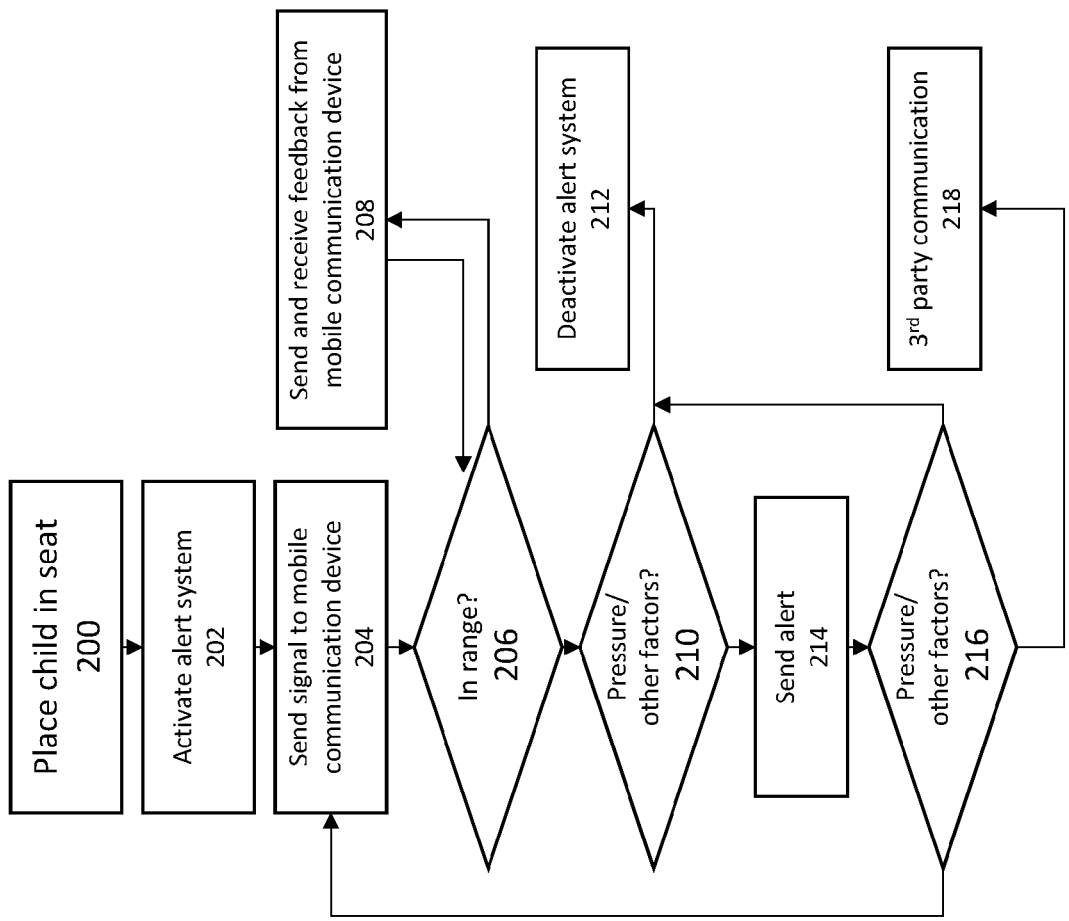
FIG. 2 is a flow chart showing an exemplary embodiment of an alert system.

Referring now to exemplary FIG. 2, a flow chart showing one embodiment of an alert system may be shown and described. First, a child may be placed in a child safety seat equipped with the alert system in 200. In 202, the alert system may be activated. As discussed above, this may be done automatically or manually, as desired, and the activation may further include activation of any components of the alert system, such as data transmission capabilities and temperature or other sensors. Following the activation in 202, a signal may be sent from the components of the alert system to a mobile communication device in 204. In some exemplary embodiments, Bluetooth communication may be used. As Bluetooth has a known effective range of up to about 30 feet, such a communication protocol may be desired as it can effectively determine that the mobile communication device is substantially proximate to the child safety seat. However, it may further be appreciated in 204 that a range between the child safety seat and the mobile communication device can be determined. Thus, in some examples, an alert may be sent if the range is determined to be beyond a desired distance, such as about 6 feet, as described below. Ranges of greater than 30 feet may also be used; according to such an exemplary embodiment, the alert system may switch to, or may make use of, a communication protocol other than Bluetooth for some or all of this range. For example, according to an exemplary embodiment, a different communication protocol may be used for ranges outside of the effective range of Bluetooth. It can be appreciated that this distance may be adjusted or varied for any of a variety of reasons or factors, for example the size of a vehicle in which a child safety seat is used. The communication signal may be continuously sent from the components of the alert system in the child safety seat to the mobile communication device, assuming any of a variety of factors are met.

According to an exemplary embodiment, the alert system may, when activated 202, verify that the mobile communication device is on and has power, or that the mobile communication device has a certain level of battery life, or that the mobile communication device is configured to provide alerts (such as audible alerts like ringing, vibration, or any other such alert) to a user of the mobile communication device when an alert is received by the mobile communication device, or that a mobile communication device has been successfully paired with the system. This may be done by, for example, requesting verification from the mobile communication device or from an agent running on the mobile communication device, or may be provided automatically by the mobile communication device, as desired. Verification may be provided using any data transmission medium, such as a Bluetooth connection. If verification is not provided when the alert system is activated—for example, if the user of the mobile communication device has turned it off, or if no mobile communication device has been paired with the alert system in the first place—the alert system may provide an alert immediately using hardware of the alert system, such as an audible alert or a flashing light. This may be used to inform the user of the mobile communication device that it may not be possible to provide them with an alert by signaling the mobile communication device of the user.

Still referring to exemplary FIG. 2, in 206 components of the alert system can determine a range of the mobile communication device to the car seat associated with the alert system, or any other desired factors. For example, if it is determined that the mobile communication device is within a predetermined range of the child safety seat, for example about 6 feet, a continuous, or substantially continuous, signal, such as a Bluetooth data signal, may be transmitted to, and received by, the mobile communication device in 208, any known or desired form of confirmation or return data transmission. This may serve to let the alert system know that the conditions are normal and no alert is needed. For example, this condition may be met while a parent is finishing securing a child in a child safety seat or while a parent is driving with the child in the child safety seat in the vehicle. If it is determined that the mobile communication device is outside the desired or predetermined range of the child safety seat, then further determinations and actions may be made in 210. For example, if the mobile communication device is outside of the desired or predetermined range of the child safety seat and there is no longer any pressure being sensed by the pressure sensor of the components of the alert system, then the alert system, in 212, may be immediately deactivated or deactivated after a predetermined or desired amount of time, for example, to preserve or prolong battery life.

If, however, in 210 it is determined that a child is or may still be in the child safety seat and the mobile communication device is out of the set range, an alert may be sent, substantially immediately after the condition is met, in 214. Such an alert may also be transmitted, for example, if other conditions are met, such as the sensing of a high or low temperature, an impact reading determined by an accelerometer, or any other condition, as desired. In the exemplary embodiment where a mobile communication device is out of range, the determination can be made in any of a variety of fashions. For example, a range determining function of the microcontroller may determine a predetermined distance has been exceeded or the components may cease being able to communicate with the mobile communication device via Bluetooth because it is out of the effective range.

Still referring to exemplary step 214, an alert may be any type of alert that can be sent to a mobile communication device. The alert may be an audio alert, visual alert (such as a text message), phone call alert, vibration alert, or any other type of alert or combination thereof. The alert may further be sent via any known or desired transmission protocol. It is understood that both the components of the alert system and the mobile communication device may have compatible transmission capabilities and/or that either the data transmission and capabilities and components of the alert system (or their settings) may be adjusted or set to be compatible with the components of the mobile communication device, or vice versa. For example, any of the alerts, or instructions to activate an alert, such as a vibration on a mobile communication device, may be sent via 2G, 3G, 4G, LTE, 5G, or the like. Additionally, it is understood that at any time described herein the alert system may send any other desired data to the mobile communication device, for example the sensed temperature of the child safety seat and, if the temperature is outside of a desired range, an alert may be transmitted to the mobile communication device, regardless of a distance between the child safety seat and the mobile communication device. Further, it may be appreciated that an alert may be sent continuously, intermittently at predetermined intervals, or for any amount of time until further conditions are met.

Following the sending (and/or during continuous or intermittent sending) of the alert in 214, further queries can be made by the alert system or other factors can be assessed in 216. For example, if user resets the system or returns within a predetermined distance, or fulfills any other desired factor, the system may revert to step 204 and communication may be reestablished with the mobile communication device. Alternatively, the alerts may be deactivated by a user of the mobile communication device, and the system may be deactivated as in step 212.

However, in still other exemplary embodiments related to step 216, if other conditions are met, a third party, such as emergency medical technicians, an emergency call center, police, or other designated family or community assistance may be contacted. For example, if no response is received after step 214 for a predetermined amount of time (for example about 5 minutes, or any other amount of time, as desired), and it is determined that there is still pressure in the child safety seat indicating that a child is still sitting in the seat, an alert may be sent to the third party in 218. Additionally, the presence of other factors, including all or parts of the above factors, along with temperature information, may trigger an alert or communication being sent to the third party. For example, according to an exemplary embodiment, other factors that may be referenced by the system may include other sensors, such as cameras or active sensors, that may be more power-intensive, and which may be activated only when no response has been received after step 214 for a predetermined amount of time. This may ensure that the presence or absence of a child in the child safety seat may be verified before an alert is sent to a third party 218.

It may further be appreciated that an alert or communication with a third party can further include geographic location information, for example, obtained from a global positioning system or any other manner, for example cellular communication triangulation. Additionally, it may be appreciated that any alerts sent in 214 may continue to be sent during steps 216 and 218. Also, following step 218, any other action may be taken with respect to the alert system, as far as further sending of alerts, deactivating the system, or the like, as desired.

It may further be appreciated that, when an alert is to be sent to a third party 218, certain third parties may be prioritized above others. For example, according to an exemplary embodiment, if no response is received after step 214 for a predetermined amount of time from a primary caregiver, a system may be configured to first alert a secondary caregiver or similar third party 218. The system may then alert another third party, such as police or an emergency medical center, only if no response is received from the first third party within a predetermined amount of time. According to an exemplary embodiment, geographic location information, such as GPS data or data on nearby Wi-Fi networks, may be incorporated into the decision logic of which third parties to alert; for example, if no response is received after step 214, the closest third party that is eligible to be alerted may be alerted. Additional third parties may also be selected based on location information; for example, if GPS data determines that the vehicle is parked in a store parking lot, the system may call the store and provide an instruction to page the owner of the mobile communication device.

The system may also be configured to treat multiple mobile communication devices, such as the mobile communications devices of more than one parent, as the mobile communication device. According to an exemplary embodiment, the system may alert each of the mobile communication devices 214 when all such devices have gone out of range. Alternatively, one of the mobile communication devices may be selected as a primary mobile communication device, for example if it is the last such device to leave the range of the vehicle, and may be sent an alert 214 if an alert is to be sent. In another exemplary embodiment, one mobile communication device 214 may be paired with multiple systems; for example, a family may have multiple small children, each of which has a car safety seat, and the system of each seat may be paired with one mobile communication device 214.

Figure 3:
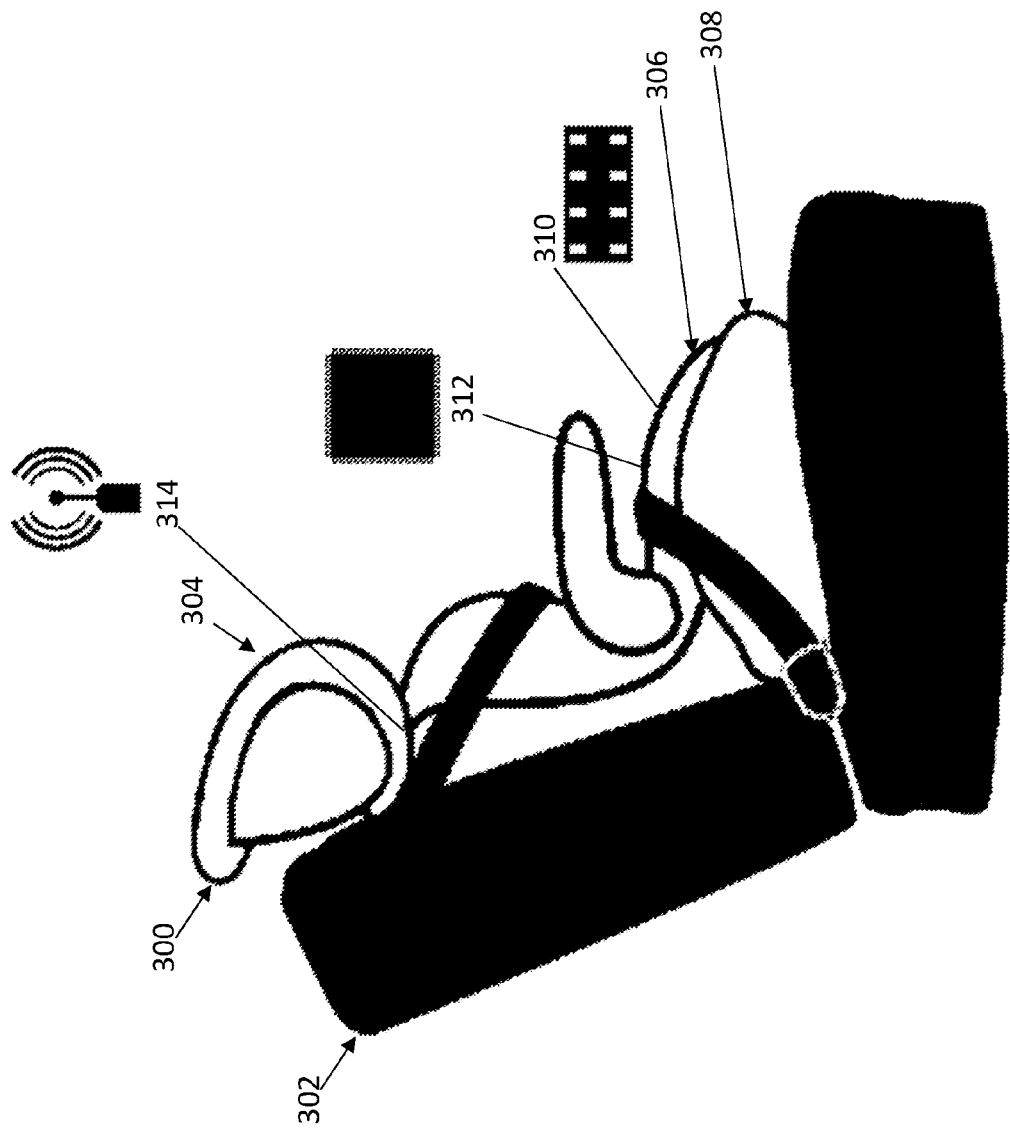
FIG. 3 is a diagram showing an exemplary embodiment of a car safety seat having an alert system.

Referring now to exemplary FIG. 3, a diagram showing an exemplary embodiment of a car safety seat having an alert system 300 may be displayed. Car safety seat 300 may be coupled to a seat of a car or other vehicle 302, for example by using the seat belts or by using a strap or other attachment system attached to the car safety seat 300. Car safety seat 300 may include, for example, a headrest 304, a cushion 306, and a frame 308, as well as other structural components or other components, as desired. According to an exemplary embodiment, a pressure sensor 310, as well as a microcontroller or other computer 312, may be housed within the cushion 306 of the car safety seat 300. According to another exemplary embodiment, the pressure sensor 310 and the microcontroller 312 may be housed elsewhere, for example on the frame 308 under the cushion 306. Car safety seat 300 may also include one or more wireless transceivers 314, such as a wireless transceiver configured to use the Bluetooth communication protocol or another communication protocol, as desired. According to an exemplary embodiment, wireless transceivers 314 may be placed in a relatively elevated or exposed location on the car safety seat 300, such as in or on the headrest 304, or in an elevated part of the frame 308, as desired.

According to an exemplary embodiment, the car safety seat 300 may be integrated to some extent with the parent vehicle. For example, according to an exemplary embodiment, the car safety seat 300 may be connected to the vehicle power system and may receive power from the vehicle power system. According to another exemplary embodiment, the vehicle may include a display or other user interface, such as a front console display or another display, and the car safety seat 300 may be configured from the vehicle display or other user interface. According to another exemplary embodiment, the vehicle may include a wireless transceiver, such as a wireless transceiver that is equipped to communicate with a key fob. The car safety seat 300 may be equipped to communicate with this wireless transceiver. For example, according to one exemplary embodiment, the car safety seat 300 may be equipped to broadcast from the wireless transceiver of the vehicle, for example using a hardware link, or may be equipped to make use of it as a signal relay, as desired.

Turning now to exemplary FIGS. 4, 5a, 5b, 6a, 6b, and 7, various circuit diagrams showing various functional and operational connections of elements described herein may be shown. The diagrams in FIGS. 4-7 are merely exemplary and it may be appreciated that different components having different layouts may be used, as desired. For example, further components may have other circuit diagrams and may utilize other circuitry components. Thus, these figures should be viewed as merely exemplary and non-limiting.

Figure 4:
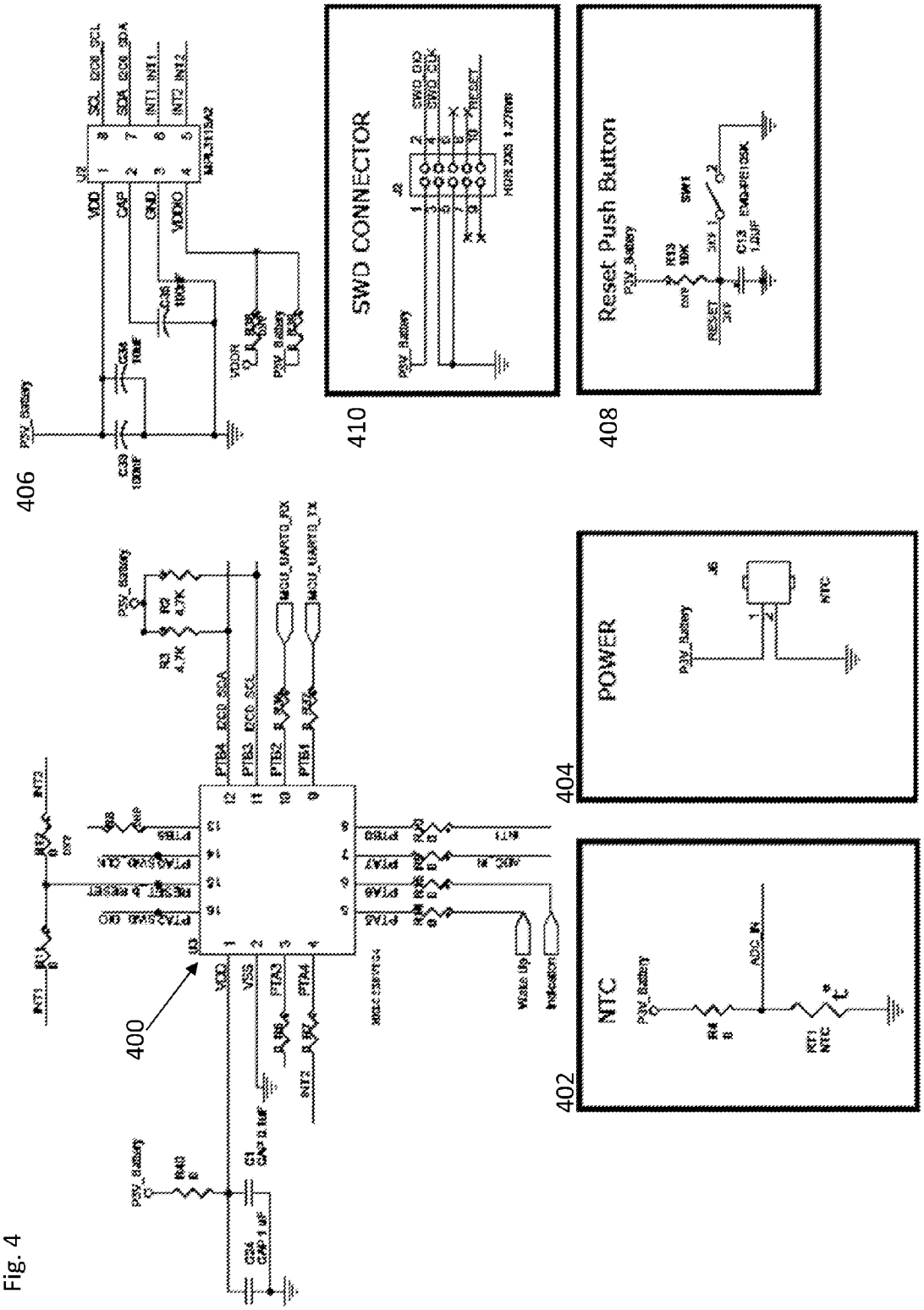
FIG. 4 is an exemplary diagram of a circuit which may be used in an alert system.

Turning first to exemplary FIG. 4, FIG. 4 depicts an exemplary embodiment of a circuit that may be used to implement some or all of the features of a car safety seat. The circuit may include, for example, a control unit 400, such as a microcontroller. Control unit 400 may be connected to an NTC thermistor or other temperature measurement device 402, a power circuit 404, a pressure sensor 406, and a reset switch 408, as well as other sensors or other devices, as desired. Power circuit 404 may be connected to a battery or other power source, as desired. Circuit may also include one or more connectors, such as SWD connectors 410, which may be used to, for example, connect the reset switch 408 to the control unit 400, or connect other devices to each other, as desired.

Figure 5A:
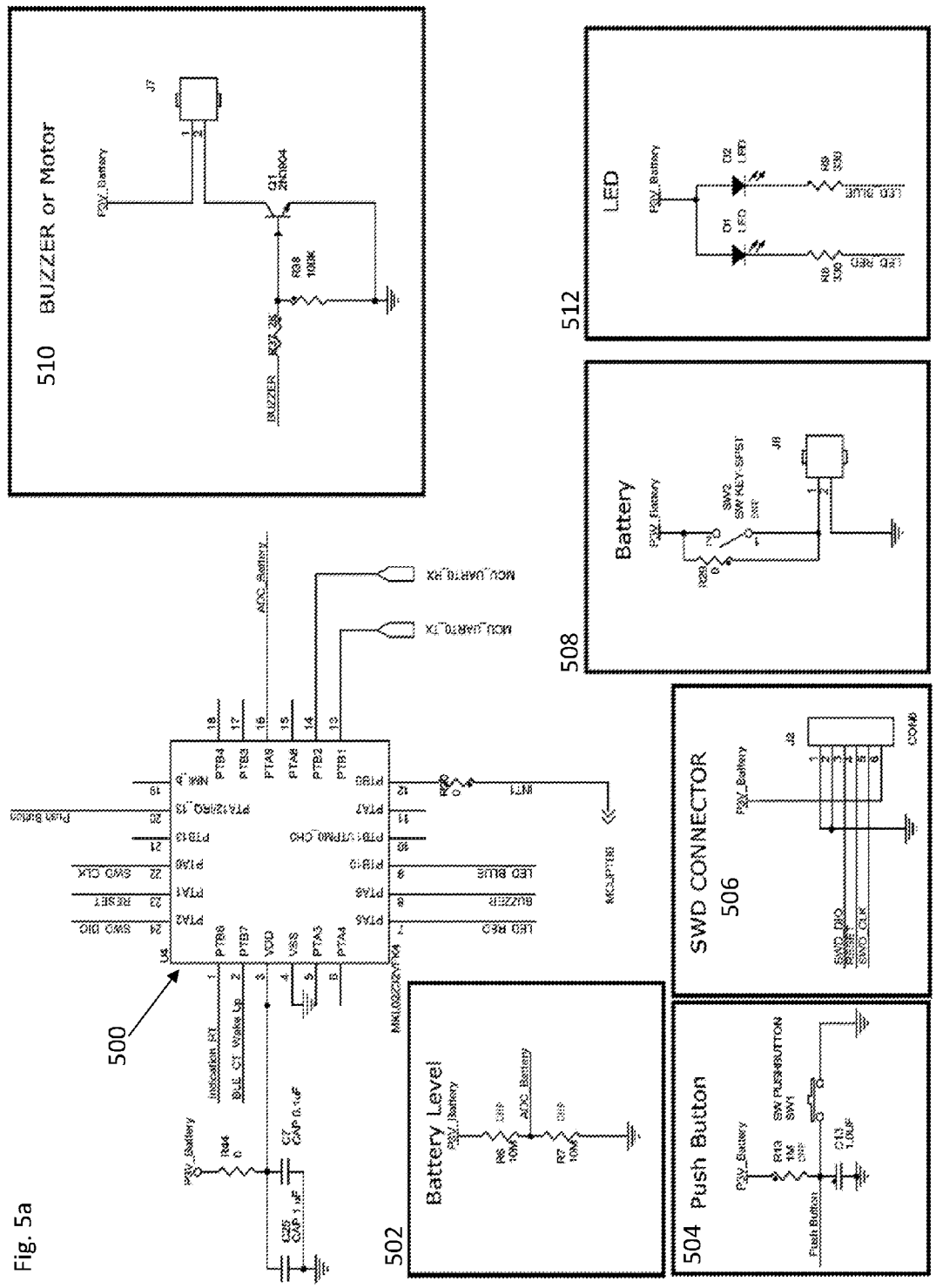
FIG. 5a is an exemplary diagram of a circuit which may be used in an alert system.

Turning next to exemplary FIG. 5a, FIG. 5a depicts an exemplary embodiment of a circuit that may be used to implement some or all of the features of a car safety seat. The circuit may include, for example, a control unit 500, such as a microcontroller. Control unit 500 may be connected to a battery level circuit 502 that may provide an indication of the current state of the battery to the control unit 500; a switch 504, such as a push-button, that may be used to send external commands to the control unit 500; a battery 508 or other power supply; a buzzer, motor, or other device capable of providing sensory feedback 510, and one or more LEDs 512, for example a red and a blue LED, that may be used to provide indications about the state of the control unit 500 or the overall system. Other sensors or other devices may also be used, as desired. Circuit may also include one or more connectors, such as SWD connectors 506, which may be used to connect devices to each other, as desired; for example, in an exemplary embodiment, an external device may be connected to an SWD connector 506, which may allow information and/or instructions to be sent via hardware connection between the control unit 500 and the external device, which may allow, for example, programs to be written or burned to the control unit 500.

According to an exemplary embodiment, the battery 508 or other power supply may make use of a key switch, which may be used to activate or deactivate the battery 508 or other power supply. In an exemplary embodiment, this may allow a user of the car safety seat to directly engage or disengage the car safety seat device, activating or deactivating the control unit. In another exemplary embodiment, this may allow a user of the car safety seat to use a key placed in another location, such as in a vehicle ignition, to engage or disengage the car safety seat device; for example, the car safety seat device may be configured to come on when the car ignition has been recently inactivated.

Figure 5B:
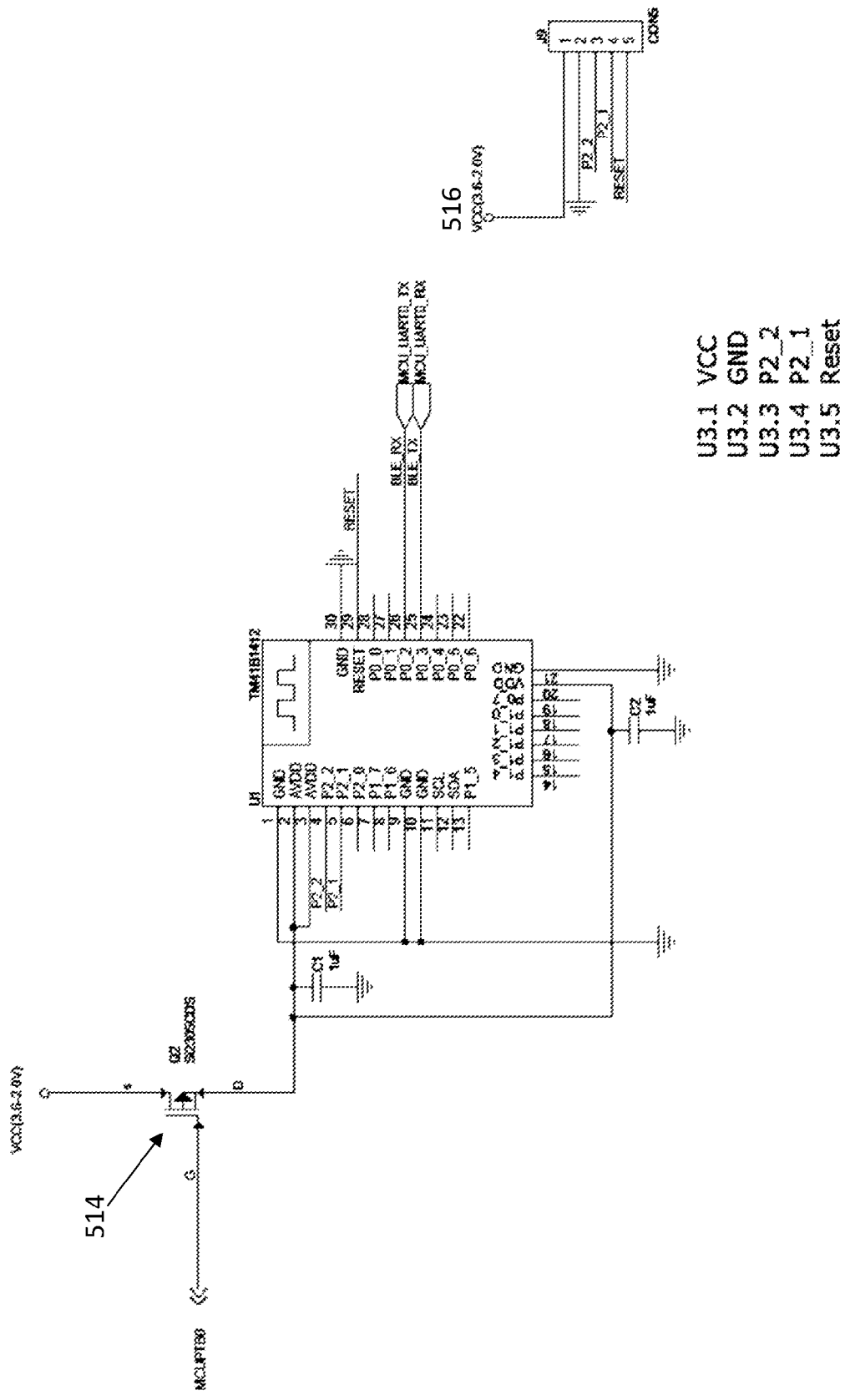
FIG. 5b is an exemplary diagram of a circuit which may be used in an alert system.

Turning next to exemplary FIG. 5b, FIG. 5b depicts an exemplary embodiment of a circuit that may be used to implement some or all of the features of a car safety seat, and which may be connected to the control unit 500 of FIG. 5a. The circuit shown in FIG. 5b may additionally include a wireless communication device 514, such as a Bluetooth or Bluetooth low energy chip or another chip or device enabling wireless connectivity. This may allow the control unit 500 to be paired with another device, such as a mobile device belonging to a user or a control console of a vehicle, and may allow information and/or instructions to be sent to or from the control unit 500. The circuit shown in FIG. 5b may also include a connector 516, which may connect the control unit 500 and the wireless communication device 514, or another device and the wireless communication device 514. This may allow information and/or instructions to be sent via hardware connection to or from the wireless communication device 514, which may allow, for example, programs to be written or burned to the wireless communication device 514.

Turning next to exemplary FIG. 6, FIG. 6 depicts an exemplary embodiment of a circuit that may be used to implement some or all of the features of a car safety seat. The circuit may include, for example, a control unit 600, such as a microcontroller. Control unit 600 may be connected to an NTC thermistor or other temperature measurement device 602, a battery level circuit 604 that may provide an indication of the current state of a battery 606 or other power supply to the control unit 600; a battery 608 or other power supply; and a buzzer, motor, or other device capable of providing sensory feedback 610. Various types of devices may be used in order to provide sensory feedback; for example, a device to provide sensory feedback 610 may be a standard buzzer, an explosion-proof buzzer, or another noisemaking device, as desired. Other sensors or other devices may also be used, as desired. Circuit may also include one or more connectors, such as SWD connectors 606, which may be used to connect devices to each other, as desired; for example, in an exemplary embodiment, an external device may be connected to an SWD connector 606, which may allow information and/or instructions to be sent via hardware connection between the control unit 600 and the external device, which may allow, for example, programs to be written or burned to the control unit 600.

According to an exemplary embodiment, the circuit of the battery 608 or other power supply may include a push-button switch, which may be used to send a power-check signal or a power-hold signal to the control unit 600. These signals may cause the control unit 600 to be powered on or off via the operation of the push-button, or may cause a signal indicating the power level of the battery 606 or other power source to be checked.

Figure 6A:
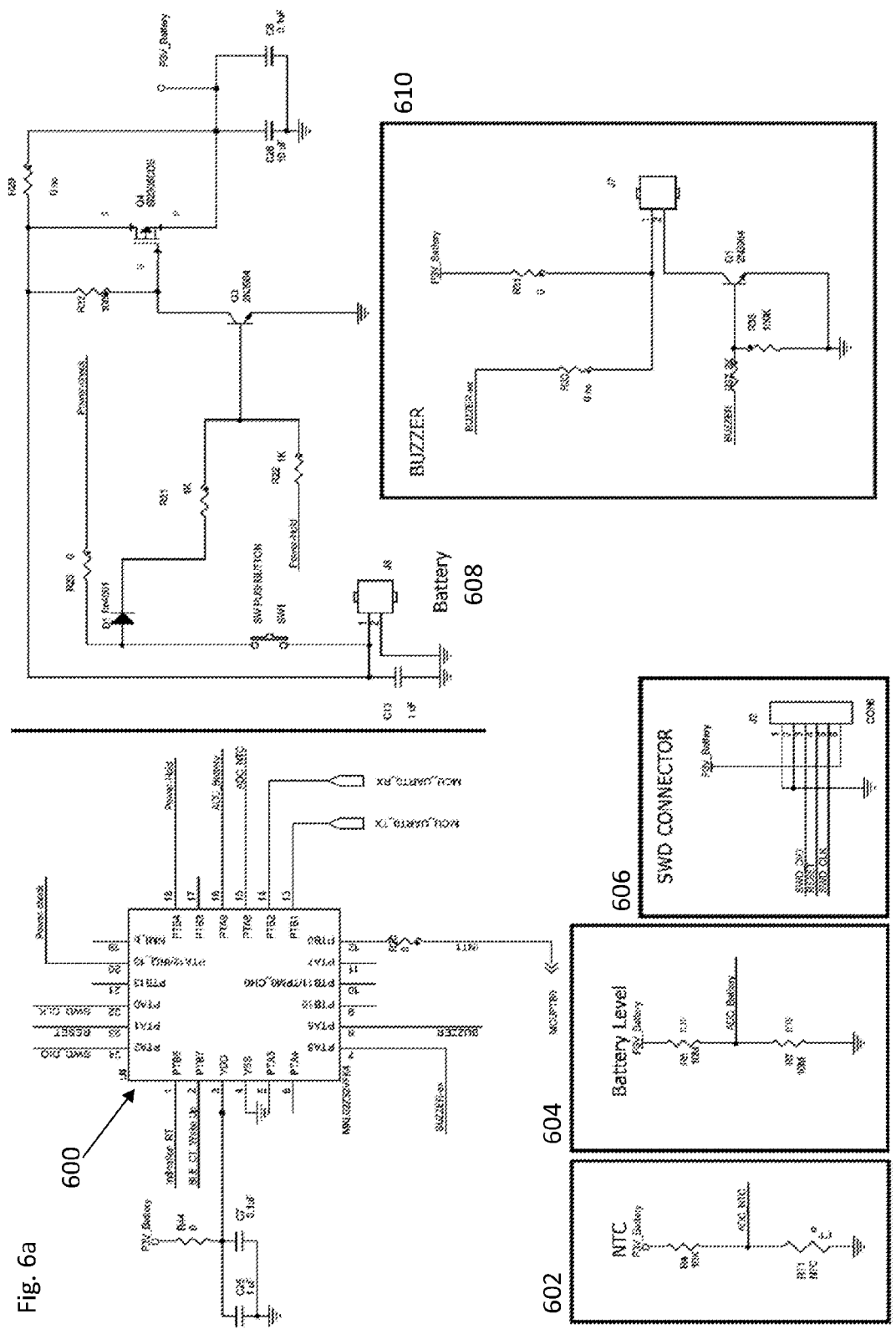
FIG. 6a is an exemplary diagram of a circuit which may be used in an alert system.
Figure 6B:
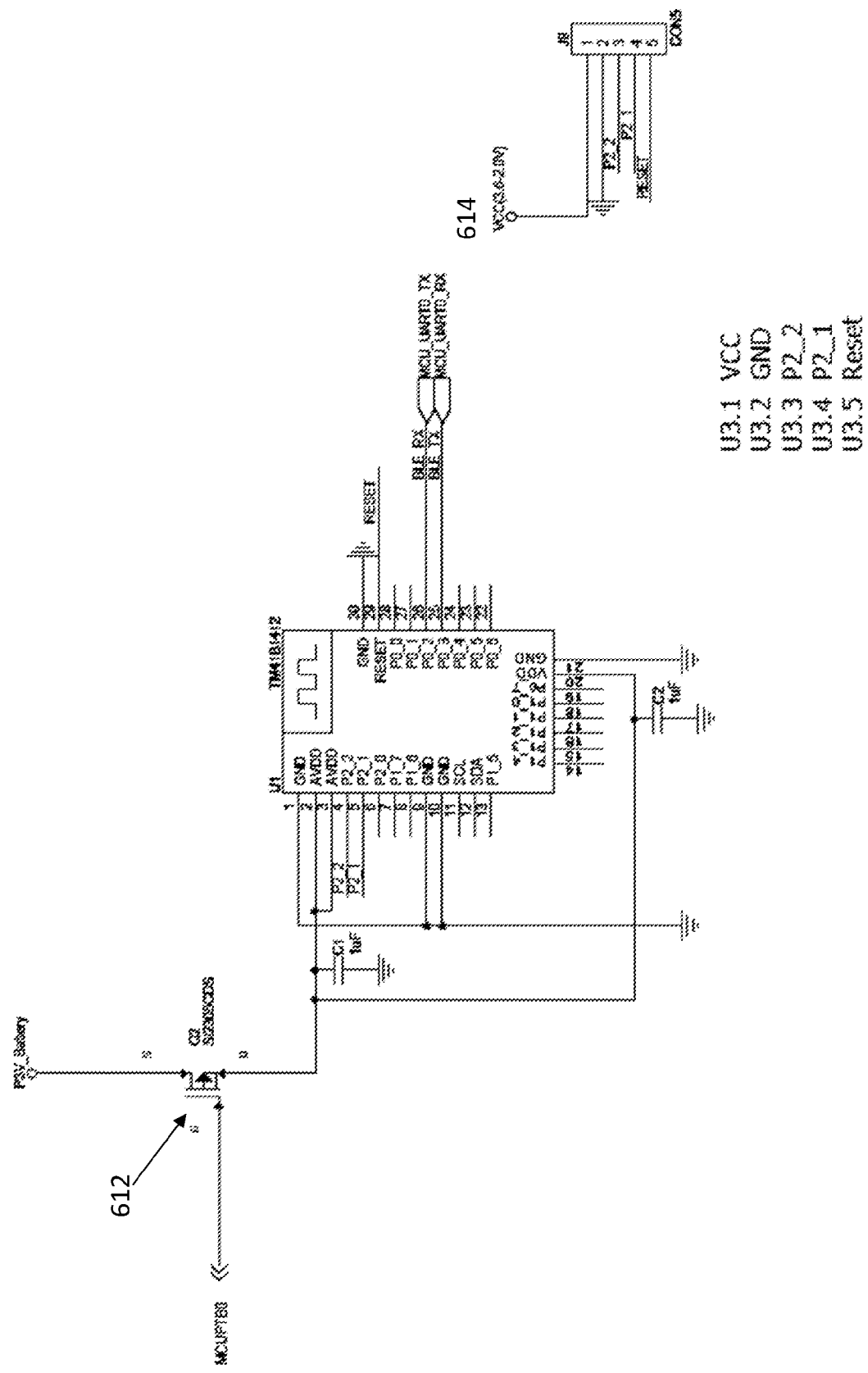
FIG. 6b is an exemplary diagram of a circuit which may be used in an alert system.

Turning next to exemplary FIG. 6b, FIG. 6b depicts an exemplary embodiment of a circuit that may be used to implement some or all of the features of a car safety seat, and which may be connected to the control unit 600 of FIG. 6a. The circuit shown in FIG. 6b may additionally include a wireless communication device 612, such as a Bluetooth or Bluetooth low energy chip or another chip or device enabling wireless connectivity. This may allow the control unit 600 to be paired with another device, such as a mobile device belonging to a user or a control console of a vehicle, and may allow information and/or instructions to be sent to or from the control unit 600. The circuit shown in FIG. 6b may also include a connector 614, which may connect the control unit 600 and the wireless communication device 612, or another device and the wireless communication device 612. This may allow information and/or instructions to be sent via hardware connection to or from the wireless communication device 612, which may allow, for example, programs to be written or burned to the wireless communication device 612.

Figure 7:
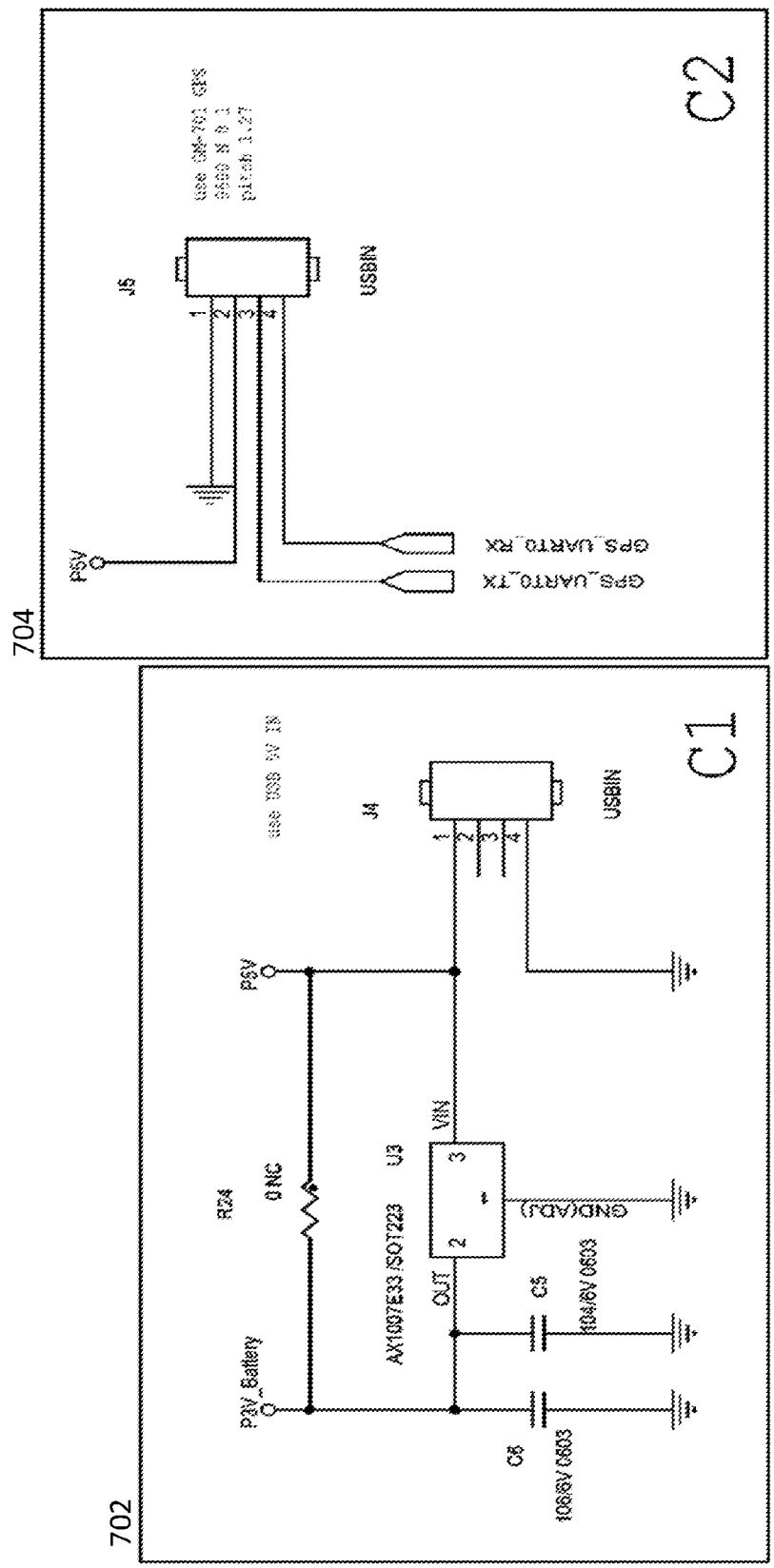
FIG. 7 is an exemplary diagram of a circuit which may be used in an alert system.

Turning next to exemplary FIG. 7, FIG. 7 depicts an exemplary embodiment of a circuit that may be used to implement some or all of the features of a car safety seat, and which may be connected to a control unit, such as a control unit 500 or 600. The circuit of FIG. 7 may include an external power supply 702, such as a USB power supply, which may be connected to, for example, a battery in the circuit or one or more components of the system, as desired. External power supply 702 may be used to charge or recharge the battery in the circuit, or may be used to power one or more components of the system, as desired.

The circuit of FIG. 7 may include a SIM card or other GPS locating feature 704, which may be used in order to provide a car safety seat with a stand-alone GPS feature. This may allow the car safety seat to retrieve its location, for example in order to send its location to a user or to an authority. In an exemplary embodiment, SIM card or other GPS locating feature 704 may be provided on an external device or external module, such as a vehicular GPS system or a stand-alone GPS navigation system, or another such device, as desired. In another exemplary embodiment, SIM card or other GPS locating feature 704 may be fixedly disposed within the car safety seat, and may be linked to the car safety seat via a port or integrated via a fixed connection.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of providing an alert when a child is in a child safety seat within a vehicle, the method comprising:
   placing the child in the child safety seat, the child safety seat being communicatively coupled to an alert system comprising at least a pressure sensor, a processor, a memory, and a wireless transceiver;
   activating the alert system;
   sending, with the wireless transceiver, at least one first signal from the child safety seat to a mobile communication device;
   determining, with the processor, whether the mobile communication device is within a specified range of the child safety seat;
   determining, with the processor, if the mobile communication device is not within a specified range of the child safety seat, whether there is at least a specified amount of pressure on the pressure sensor;
   with the processor, deactivating the alert system if there is not at least a specified amount of pressure on the pressure sensor;
   sending, with the wireless transceiver, at least one alert signal to the mobile communication device if there is at least a specified amount of pressure on the pressure sensor;

determining, with the processor, if a response to the alert signal has been received within a specified amount of time, the response to the alert signal comprising at least one of a reset instruction being delivered to the alert system or the mobile communication device being placed within the specified range of the child safety seat; and sending, with the wireless transceiver, at least one alert signal to a communication device of a third party if no response to the alert signal has been received within the specified amount of time.

2. The method of claim 1, wherein the alert system further comprises a temperature sensor, and further comprising sending, with the wireless transmitter, an indication of the sensed temperature of the child safety seat.

3. The method of claim 1, wherein the alert system further comprises a GPS receiver, and wherein the step of sending, with the wireless transceiver, at least one alert signal to a communication device of a third party if no response to the alert signal has been received within the specified amount of time further comprises sending GPS data to the third party.

4. The method of claim 1, wherein the alert system further comprises a GPS receiver, and wherein the step of sending, with the wireless transceiver, at least one alert signal to a communication device of a third party if no response to the alert signal has been received within the specified amount of time further comprises:

determining, with a processor and from the GPS data, the current location of the alert system;

selecting, with a processor, one or more nearby third parties to be contacted based on the proximity of each third party to the current location of the alert system; and sending, with the wireless transceiver, at least one alert signal to a communication device of the one or more nearby third parties.

5. The method of claim 1, further comprising:

detecting, with a processor, the presence of an adverse condition, wherein the adverse condition comprises at least one of a temperature reading above a specified level, a temperature reading below a specified level, or an accelerometer reading above a specified level; and sending, with the wireless transceiver, at least one alert signal to a mobile communication device indicating the presence of the adverse condition.

6. The method of claim 1, wherein the step of sending, with the wireless transceiver, at least one first signal from the child safety seat to a mobile communication device further comprises requesting a return signal from the mobile communication device indicating at least one of: a power state of the mobile communication device, a volume state of the mobile communication device, or a wireless connection state of the mobile communication device.

7. The method of claim 6, further comprising:

determining if a return signal from the mobile communication device has been received by the alert system; and generating, with the alert system, an alert local to the alert system if no return signal has been received.

8. The method of claim 1, further comprising:

determining, with the processor, if a response to the alert signal sent to a third party has been received within a specified amount of time; and sending, with the wireless transceiver, at least one alert signal to a communication device of at least one other third party if no response to the alert signal has been received within the specified amount of time.

9. The method of claim 1, wherein the alert system has at least one other sensor system, and further comprising activating the at least one other sensor system if no response to the alert signal has been received within the specified amount of time and before sending at least one alert signal to a communication device of a third party.

10. A system for providing an alert when a child is in a child safety seat within a vehicle, the system comprising:

a child safety seat, the child safety seat comprising a cushion having a pressure-sensitive pad, the pressure-sensitive pad comprising:

a pressure sensor, the pressure sensor being configured to detect pressure on at least part of the area of the pressure-sensitive pad, a microcontroller, the microcontroller having a processor and a memory, and a wireless transceiver configured to utilize at least one wireless transmission protocol; and a mobile communication device configured to communicate with the wireless transceiver via the at least one wireless transmission protocol;

wherein the child safety seat is configured to perform the following actions:

detecting, with the pressure sensor, the placement of the child in the child safety seat;

sending, with the wireless transceiver, at least one first signal to the mobile communication device;

determining, with the microcontroller, whether the mobile communication device is within a specified range of the child safety seat;

determining, with the microcontroller, if the mobile communication device is not within a specified range of the child safety seat, whether there is at least a specified amount of pressure on the pressure sensor;

with the microcontroller, deactivating the alert system if there is not at least a specified amount of pressure on the pressure sensor;

sending, with the wireless transceiver, at least one alert signal to the mobile communication device if there is at least a specified amount of pressure on the pressure sensor;

determining, with the microcontroller, if a response to the alert signal has been received within a specified amount of time, the response to the alert signal comprising at least one of a reset instruction being delivered to the alert system or the mobile communication device being placed within the specified range of the child safety seat; and sending, with the wireless transceiver, at least one alert signal to a communication device of a third party if no response to the alert signal has been received within the specified amount of time.

11. The system of claim 10, wherein the child safety seat has a power supply, and wherein the power supply is the electrical system of the vehicle.

12. The system of claim 10, wherein the vehicle has a display, and wherein the child safety seat is communicatively coupled with the display of the vehicle.

13. The system of claim 10, wherein the vehicle has a wireless transceiver; and wherein the wireless transceiver of the child safety seat utilizes at least one communication protocol in common with the wireless transceiver of the vehicle.

14. The system of claim 13, wherein the mobile communication device is a key fob.

15. The system of claim 10, wherein the child safety seat further comprises at least one of a temperature sensor or an accelerometer.

16. The system of claim 15, wherein the child safety seat is further configured to perform the following actions:
- detecting, with a processor, the presence of an adverse condition, wherein the adverse condition comprises at least one of a temperature reading above a specified level, a temperature reading below a specified level, or an accelerometer reading above a specified level; and
- sending, with the wireless transceiver, at least one alert signal to a mobile communication device indicating the presence of the adverse condition.

17. The system of claim 10, wherein the at least one wireless communication protocol comprises a first wireless communication protocol and a second wireless communication protocol;
- wherein the child safety seat communicates with the mobile communication device using the first wireless communication protocol when the child safety seat and the mobile communication device are spaced apart at a distance less than a specified distance; and
- wherein the child safety seat communicates with the mobile communication device using the second wireless communication protocol when the child safety seat and the mobile communication device are spaced apart at a distance greater than a specified distance.

18. A child safety seat, comprising:
- a frame;
- a power supply;
- a temperature detector;
- a cushion, comprising a liquid-tight outer layer, padding, and a pressure-sensitive pad, the pressure-sensitive pad comprising:
  - a pressure sensor, the pressure sensor being configured to detect pressure on at least part of the area of the pressure-sensitive pad,
  - a microcontroller, the microcontroller having a processor and a memory, and
  - a wireless transceiver configured to utilize at least one wireless transmission protocol;
- a GPS module communicatively coupled to the microcontroller of the pressure-sensitive pad, and configured to provide GPS information to the microcontroller; and
- a warning system, the warning system comprising a visual component and an audial component, the visual component comprising at least one of a light and a visual display, the audial component comprising at least one of a buzzer, a motor, or a speaker;
wherein the microcontroller is configured to:
- detect, with the pressure sensor, the placement of the child in the child safety seat;
- send, with the wireless transceiver, at least one first signal to a mobile communication device;
- determine whether the mobile communication device is within a specified range of the child safety seat;
- determine, if the mobile communication device is not within a specified range of the child safety seat, whether there is at least a specified amount of pressure on the pressure sensor;
- deactivate the alert system if there is not at least a specified amount of pressure on the pressure sensor;
- send, with the wireless transceiver, at least one alert signal to the mobile communication device if there is at least a specified amount of pressure on the pressure sensor;
- determine if a response to the alert signal has been received within a specified amount of time, the response to the alert signal comprising at least one of a reset instruction being delivered to the alert system or the mobile communication device being placed within the specified range of the child safety seat; and
- send, with the wireless transceiver, at least one alert signal to a communication device of a third party if no response to the alert signal has been received within the specified amount of time, wherein the alert signal comprises GPS location information.

19. The child safety seat of claim 18, wherein the child safety seat further comprises a reset switch disposed on the child safety seat and operable to provide a reset instruction to the alert system.

20. The child safety seat of claim 18, further comprising a key switch operable with a key and configured to enable or disable the child safety seat.

* * * * *